United States Patent [19]

González et al.

[11] Patent Number: 4,861,863

[45] Date of Patent: Aug. 29, 1989

[54] PROCESS FOR THE PRODUCTION AND PURIFICATION OF SH-TERMINATED PREPOLYMERS AND USE THEREOF

[75] Inventors: Renè-Andrés A. González, Duesseldorf; Winfried Emmerling, Erkrath; Werner Krause, Duesseldorf; Tore Podola, Monheim; Klaus Neitzer, Duesseldorf, all of Fed. Rep. of Germany

[73] Assignee: Henkel Kommanditgesellschaft auf Aktien, Duesseldorf, Fed. Rep. of Germany

[21] Appl. No.: 115,225

[22] Filed: Oct. 30, 1987

[30] Foreign Application Priority Data

Oct. 31, 1986 [DE] Fed. Rep. of Germany ....... 3637151

[51] Int. Cl.⁴ ............................................. C08G 65/02
[52] U.S. Cl. ................................. 528/408; 525/408; 528/405; 528/425; 528/485; 528/487; 528/488; 528/489; 528/501
[58] Field of Search .............. 528/408, 405, 425, 485, 528/487, 488, 489, 501; 525/408, 533

[56] References Cited

U.S. PATENT DOCUMENTS 3,549,565 12/1970 Jones et al. ........................... 260/7.5
3,881,047 4/1975 Massy et al. ........................ 428/378
3,931,078 1/1976 Marrs et al. ........................... 260/28

OTHER PUBLICATIONS

U.S. Pat. No. 3,306,875, cols. 1–2.

*Primary Examiner*—Harold D. Anderson
*Attorney, Agent, or Firm*—Ernest G. Szoke; Wayne C. Jaeschke; Real J. Grandmaison

[57] ABSTRACT

Process for the production and purification of SH-terminated prepolymers by reaction of polyhydroxy compounds with thioalkane carboxylic acids, wherein one or more adducts of ethylene oxide and/or propylene oxide with triols or tetraols corresponding to the following general formula

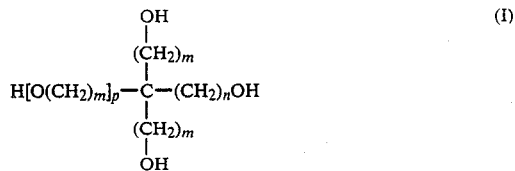

in which
m = 1, 2 or 3,
n = 0, 1 or 2 and
p = 0 or 1, and having a molecular weight of from 400 to 10,000 are reacted with one or more thiolkane carboxylic acids corresponding to the following general formula

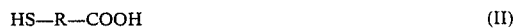

in which R is a straight-chain or branched $C_1$–$C_8$ alkylene radical, in such a molar ratio that, for every mole of thioalkane carboxylic acid (II), there is an equivalent of the OH groups in compound (I), a neutralizing agent is added to the reaction mixture in a quantity sufficient to neutralize the unreacted quantity of thioalkane carboxylic acid (II), one or more compounds which bind the water of neutralization and a precipitant in excess are added at the same time as or immediately after the neutralizing agent, the reaction mixture is freed in known manner from the precipitated solids and, if desired, the prepolymer is isolated.

17 Claims, No Drawings

PROCESS FOR THE PRODUCTION AND PURIFICATION OF SH-TERMINATED PREPOLYMERS AND USE THEREOF

BACKGROUND OF THE INVENTION

1. Field of the Invention

This invention relates to a process for the production and purification of SH-terminated prepolymers obtainable, for example, from a polyether polyol and a thioalkane acid, and to the use of the products obtained in the reaction after their purification.

2. Statement of Related Art

Processes for the production of SH-terminated polyether polyol derivatives have been known for some time from the prior art. Compounds of this type are normally formed by reaction of polyether polyols and bifunctional compounds containing an SH-function, such as for example mercapto-group-containing nitriles, carboxylic acids, carboxylic acid amides, carboxylic acid halides, etc. Products such as these are used, for example, in sealing and coating compositions, in the modification of synthetic or natural fibers, and as auxiliaries in the construction field.

Thus, U.S. Pat. No. 3,881,047 describes SH-terminated polymers and a process for the modification of synthetic fibers free from keratin-containing materials using these polymers which may be obtained, for example, from polyols and thioalkane acids. The polythiols described in U.S. Pat. No. 3,881,047 accumulate during the production process in the form of emulsions which are then directly applied to the fibers and, hence, do not have to be isolated. In addition, by virtue of the reaction by which the polythiols are applied to the fibers after the synthesis step, the degree of reaction does not have to be carefully controlled insofar as only those polythiols which are formed from polyol and thioalkane carboxylic acid become attached to the fibers; this reaction is controlled by the additional components to be added to the reaction mixture. There was no need in the process described in U.S. Pat. No. 3,881,047 to obtain defined products having certain characteristic properties, for example acid numbers below a certain limit.

U.S. Pat. No. 3,549,565 describes a process for the production of elastomeric materials by reaction of polyester polyethers containing mercapto groups and at least one organic dimercapto compound in the presence of oxidizing crosslinking agents, such as for example lead dioxide or zinc oxide. The mercapto-group-containing polyester polyethers to be used in the crosslinking reaction are used in the form of a prepolymer which may be prepared from a polyhydroxypolyether and a mercaptoalkane carboxylic acid. Although the process described in U.S. Pat. No. 3,549,565 attempts—by using the starting materials in stoichiometric quantities—to guarantee a complete reaction insofar as the reaction mixture is not left with any unreacted acidic reactants which could subsequently impair the crosslinking effect of the basic heavy metal oxides, the washing process described in the patent specification, which is also applied in the prior art and which is supposed to guarantee substantial elimination of the excess acid remaining, leads to technical difficulties insofar as emulsions which jeopardize reproducibility of the prepolymer obtained in terms of quality are formed as a product mixture. However, the incomplete removal of the thioalkane carboxylic acid introduced into the reaction as starting material inevitably results in the formation of poorer, unsatisfactory elastomeric materials characterized, for example, by lower hardness or poorer elasticity (depending on the application envisaged for the end products).

Comparable with the process described in U.S. Pat. No. 3,549,565 is the process described by the same patentee in U.S. Pat. No. 3,931,078 for the production of comparable compounds which may also be used in surface coating and sealing compositions. The mercapto groups are again oxidatively crosslinked through the use of basic heavy metal salts or oxides which are highly sensitive to acid residues remaining in the reaction mixture. This process also seeks to achieve complete removal of excess acid, although this cannot be achieved, or cannot be completely achieved, through the proposed process measures of washing out via an emulsion.

DESCRIPTION OF THE INVENTION

Other than in the operating examples, or where otherwise indicated, all numbers expressing quantities of ingredients or reaction conditions used herein are to be understood as modified in all instances by the term "about" all molecular weights set forth herein are number average molecular weights.

An object of the present invention is to develop a simple and inexpensive process for the production and, in particular, for the purification of SH-terminated prepolymers and hence to provide acid-free or at least substantially acid-free products which can then be readily reacted with the heavy metal oxides or salts used as crosslinking agents. The disadvantages of the prior art, more especially the inadequate removal of the excess thioalkane carboxylic acid, are eliminated through the incorporation in the production process of a simple and inexpensive, but efficient purification step. In this way, the products obtainable by the present process are made accessible to a broader range of applications, namely, to the use of the prepolymers in joint sealing compounds. The above prepolymers for use in these joint sealing compounds show a low elasticity modulus and a tack-free surface after hardening. However, the prepolymers obtainable in accordance with the invention also show such properties that make them suitable for use in the production of epoxy resins; being used in preference to thinly liquid prepolymers in the production of such resins by virtue of their better handling properties.

It has now surprisingly been found that, by direct reaction of certain macrotriols with certain thioalkane acids in such a molar ratio that, for each hydroxy group of the macrotriol, there is an ester-forming carboxyl group of the carboxylic acid, a group of prepolymers which completely satisfy the requirements made of them are obtained. In addition, the process leading to these products uses a simple neutralization step and, accordingly, removes unreacted excesses of the thioalkane carboxylic acid to such an extent that the acid number of the prepolymer is entirely suitable for the further crosslinking reaction.

Accordingly, the present invention relates to a process for the production and purification of SH-terminated prepolymers by reaction of polyhydroxy compounds with thioalkane carboxylic acids wherein one or more adducts of ethylene oxide and/or propylene oxide with triols or tetraols corresponding to the following general formula

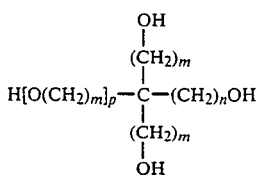

$$H[O(CH_2)_m]_p\text{—}\underset{\underset{OH}{\underset{|}{(CH_2)_m}}}{\overset{\overset{OH}{\overset{|}{(CH_2)_m}}}{C}}\text{—}(CH_2)_n OH \qquad (I)$$

in which
  m = 1, 2 or 3,
  n = 0, 1 or 2 and
  p = 0 or 1,
and having a molecular weight of from 400 to 10,000 are reacted with one or more thioalkane carboxylic acids corresponding to the following general formula

HS—R—COOH    (II)

in which R is a straight-chain or branched $C_1$-$C_8$ alkylene radical, in such a molar ratio that, for every mole of thioalkane carboxylic acid (II), there is an equivalent of OH groups in compound (I), a neutralizing agent is then added to the reaction mixture in a quantity sufficient to neutralize the unreacted quantity of thioalkane carboxylic acid (II), a compound which binds the water of neutralization and a precipitant in excess are added at the same time as or immediately after the neutralizing agent, the reaction mixture is freed from the solids precipitated and added by known methods and, if desired, the prepolymer is isolated.

The present invention also relates to the use of the prepolymers obtained by the process described above in self-hardening joint sealing compounds and epoxy resin systems.

As described above, the starting materials used for the production of the SH-terminated prepolymers in the process of the invention are adducts of ethylene oxide and/or propylene oxide with triols or tetraols of formula (I).

Adducts of this type are formed in known manner by ethoxylation and/or propoxylation of triols or tetraols corresponding to general formula (I) above by addition of ethylene oxide and/or propylene oxide. Suitable triols or tetraols corresponding to general formula (I) above are any of the large number of polyhydroxy compounds familiar to those skilled in the art for this purpose, of which glycerol, trimethylolpropane and pentaerythritol are preferred examples. However, other triols or tetraols are also suitable, provided they correspond to general formula (I) above.

The reaction of the above-discussed triols or tetraols with ethylene oxide and/or propylene oxide (to be carried out in known manner, for example in the presence or absence of a solvent and under normal or elevated pressure) results in the formation through the introduction of ethoxy or propoxy groups into the O-H-bonds of the triols or tetraols corresponding to general formula (I) above—of ethoxylated or propoxylated derivatives of the triols or tetraols, of which the ethoxy or propoxy group content depends upon the reaction conditions, i.e. upon the molar ratio of the educts used, upon the pressure and temperature at which the reaction is carried out and upon the reactivity of the individual polar groups of the triols or tetraols corresponding to general formula (I). Adducts of propylene oxide with triols or tetraols corresponding to general formula (I) above are preferably used in the process of the invention. This is explained by the fact that the propoxylated derivatives of the triols or tetraols normally show better stability to hydrolysis. Irrespective of this fact, however, it is also possible to use macrotriols or macrotetraols, i.e. derivatives of the compounds corresponding to general formula (I) which may be obtained with ethylene oxide or mixtures of ethylene oxide and propylene oxide. Individual compounds having a precisely defined structure and molecular weight may readily be used as starting materials in the process of the invention. However, product mixtures covering a more or less wide molecular weight range and a more or less wide range of ethoxylated or propoxylated side chains are normally formed in industrial processes, so that mixtures of the macrotriols or macrotetraols prepared as described above are preferably used as starting materials.

Particularly preferred starting materials for the process of the invention are macrotriols derived from glycerol, because glycerol is also inexpensively available in large quantities as a starting material and even accumulates in large quantities as a secondary product in other industrial processes so that it may be used to advantage. In another preferred embodiment, glycerol is alkoxylated with propylene oxide. The resulting macrotriols are eminently suitable for the prepolymers preferably used in accordance with the invention.

The macrotriols and/or macrotetraols normally used in the process of the invention, which derive from the triols or tetraols corresponding to general formula (I) above, normally have a molecular weight in the range of from 400 to 10,000. In accordance with the uses for which the products produced by the process of the invention are contemplated, low molecular weights are particularly favorable for self-hardening epoxy resin systems, while molecular weights at the upper limit of the above-mentioned range are more favorable for use in highly elastic joint sealing compounds. Therefore, in accordance with the above proposed uses, it is possible, by choosing suitable molecular weights beforehand, to obtain products which correspond exactly to the subsequent requirement profile. In one preferred embodiment of the process of the invention, the educts used are macrotriols or macrotetraols, i.e. adducts of ethylene oxide and/or propylene oxide with triols or tetraols corresponding to general formula (I), which have a molecular weight in the range of from 2000 to 7000. Compounds such as these lend themselves particularly well to the proposed uses in self-hardening epoxy resin systems and elastic joint-sealing compounds. Particularly suitable by virtue of the excellent performance properties they impart are triols or tetraols from the group: glycerol, trimethylolpropane, and pentaerythritol, preferably glycerol, which are reacted with ethylene oxide and/or propylene oxide, preferably with propylene oxide, to form macrotriols or macrotetraols having a molecular weight of from 2000 to 7000.

In the process of the invention, the macrotriols or macrotetraols described above are reacted with one or more thioalkane carboxylic acids corresponding to general formula (II)

HS—R—COOH    (II)

in which R is a straight-chain or branched $C_1$-$C_8$ alkylene radical. Accordingly, a thioalkane carboxylic acid corresponding to the above general formula serves as the second reaction component, one or even more of the compounds encompassed by that formula serving as reactant(s) for the macrotriols or macrotetraols.

In the above general formula, R is a straight-chain or branched $C_1$-$C_8$ alkylene radical, this definition encompassing the methylene, ethylene, propylene, tetramethylene, pentamethylene, hexamethylene, heptamethylene, and octamethylene radicals and branched-chain isomers thereof. Within this group, compounds corresponding to general formula (II) which contain a straight-chain radical R are preferred. Among the above radicals, the methylene, ethylene, propylene and tetramethylene radicals are particularly preferred. Reactions of the type according to the invention with a thioalkane carboxylic acid corresponding to general formula (II) in which R is a straight-chain $C_1$-$C_4$ alkylene radical, give prepolymers having excellent service properties in the fields of application discussed below. Among the number of these thioalkane carboxylic acids, thioglycolic acid (=thioacetic acid), i.e. the thioalkane carboxylic acid corresponding to general formula (II) in which R is a methylene radical, has proven to be particularly advantageous.

The molar ratio between the two reactants, macrotriol or macrotetraol: thioalkane carboxylic acid (II), selected for the first step of the reaction of the invention for the production of SH-terminated prepolymers is adjusted more or less in such a way that, for every mole of thioalkane carboxylic acid (II), there is an equivalent of OH groups in the compound (I) originally used. If, therefore, a triol corresponding to general formula (I) is used and alkoxylated with ethylene oxide and/or propylene oxide, so that a triol is again obtained therefrom, a molar ratio of macrotriol to thioalkane carboxylic acid (II) of approximately 1:3 has to be used. A slight excess of thioalkane carboxylic acid (II) is normally used to guarantee as complete a reaction as possible. As illustrated hereinafter as a major advantage of the production and purification process of the invention, acid excesses can be conveniently eliminated completely and safely in a following, simple process step. If, however, a tetraol corresponding to general formula (I) is used as the starting material and alkoxylated with ethylene oxide and/or propylene oxide, a tetraol (macrotetraol) is again obtained therefrom, requiring a molar ratio of the starting materials macrotetraol, thioalkane carboxylic acid (II) of approximately 1:4 for the process of the invention; the foregoing observations with respect to the macrotriols again apply in regard to the slight excess of acid.

The condensation reaction between the macrotriol or macrotetraol and the thioalkane carboxylic acid corresponding to general formula (II) is an esterification reaction known per se from the prior art in which the hydroxy groups of the hydroxy compound are esterified with the carboxyl group of compound (II). This esterification reaction is carried out under the conditions normally applied in the prior art for reactions of this type. This means that the esterification may be carried out in the presence or in the absence of a solvent. An (acidic or, optionally, basic) esterification catalyst is normally added. Apart from p-toluene sulfonic acid, other compounds are known to those skilled in the art as effective esterification catalysts. The reaction is preferably carried out in a solvent which has a comparatively high boiling point and which forms an azeotrope with the water of condensation formed during the reaction. Solvents of this type known to those skilled in the art are, for example, toluene, o-xylene, p-xylene, mixtures thereof, or mixtures of these xylenes with toluene. The water of condensation formed during the reaction may readily be removed with the aid of these solvents. Where a so-called "water separator" is used in the reaction apparatus, the progress of the esterification reaction can be followed from the water of condensation formed.

The esterification reaction is carried out—as is usual in such reactions—at an elevated temperature. Provided the thermolability of the polymers formed does not necessitate a lower reaction temperature, a temperature lying in the boiling range of the solvent used is normally selected as the reaction temperature.

On completion of the esterification reaction and after approximately the predetermined quantity of water has been separated off, a neutralizing agent is added to the resulting reaction mixture in a second reaction step of the present process in a quantity sufficient to neutralize the unreacted quantity of thioalkane carboxylic acid (II). This may be a more or less large quantity of neutralizing agent, depending on the pH value at the end of the esterification reaction and on the quantity of thioalkane carboxylic acid (II) used, and also on the duration and, hence, the completeness of the reaction. The quantity of neutralizing agent used normally does not exceed one equivalent of the thioalkane carboxylic acid (11) used, at least when the reaction of the macrotriol or macrotetraol with the thioalkane carboxylic acid(s) corresponding to general formula (II) has been more or less complete. The quantity of neutralizing agent is normally between 0.1 and 0.5 equivalents, based on the quantity in which the thioalkane carboxylic acid(s) corresponding to general formula (II) is/are used.

In one preferred embodiment of the process of the invention, alkali metal hydroxides or alkali metal carbonates are used as neutralizing agents in the above-stated quantities. In order to be able to use as small a quantity of neutralizing agent as possible, sodium hydroxide or rather aqueous solutions thereof has proven to be a particularly effective neutralizing agent.

In another step of the process of the invention, a compound which binds the water of neutralization is added to the reaction mixture on completion of the esterification reaction. According to the invention, this compound is added either at the same time as or immediately after the neutralizing agent. In one preferred embodiment of the process, the compound binding the water of neutralization is added to the reaction mixture immediately after addition of the agent neutralizing any thioalkane carboxylic acid (II) present. Compounds capable of binding water of reaction present in the reaction mixture are known to those skilled in the art from the literature. Examples of water-binding compounds preferably used in the process of the invention are the alkali metal and/or alkaline earth metal sulfates, advantageously sodium sulfate and magnesium sulfate, of which the former may be used with particular advantage. Compounds such as these which bind the water of neutralization, particularly sodium sulfate, are added to the reaction mixture until they undergo no further discernible change through taking up water. This ensures that the organic phase containing the SH-terminated prepolymers is freed as far as possible from water of neutralization so that the corresponding prepolymers are present in the organic phase in substantially anhydrous form. According to the invention, the compounds which bind the water of neutralization may be used individually. However, the described processes also include those production and purification processes in which several of the water-binding compounds are added to remove the water of neutralization.

At the same time as the compound binding the water of neutralization (or several such compounds), a precipitant is added in excess to the reaction mixture. The object of this addition in the process of the invention is to convert the sediment in the reaction medium into a good, filterable form. A compound from the aluminum oxide group which contains acid groups is preferably added as a precipitant.

In a final process step, the reaction mixture is freed in known manner from the precipitated and added solids which have not passed into solution and, if desired, the prepolymer is isolated. This is done by standard methods, for example by filtering off the precipitated and added solids, particularly the solid additions from the preceding process steps which have not passed into solution, so that a clear organic phase containing the prepolymer formed and purified is obtained. If desired, one or more filtration aids may be used for this purpose. Suitable filtration aids are again known to those skilled in the art and are not the subject of the present invention.

If desired, the prepolymer can be isolated from the organic solvent phase. This may readily be done by distilling off the solvent from the purified reaction mixture under process conditions again known generally from the prior art, for example elevated temperatures and reduced pressure. The prepolymer or, where mixtures of starting materials have been used, a mixture of prepolymers is then obtained in more or less pure form.

According to the invention, the prepolymers obtained, by virtue of their advantageous properties, may be used with particular effect in self-hardening joint-sealing compounds which combine particularly good elasticity with particularly good sealing properties. However, they may also be used in self-hardening epoxy resin systems. In either case, the range of application may be controlled with particular advantage by controlling the molecular weights of the macrotriols or macrotetraols used as starting materials toward higher values for joint-sealing compounds and toward lower values for self-hardening epoxy resin systems. This may be done, for example, through the ethoxylation step. Another method of control is to use different thioalkane carboxylic acids for esterification of the macrotriols or macrotetraols described above.

Accordingly, the production and purification process of the invention gives SH-terminated prepolymers which, in contrast to the prepolymers known from the prior art, no longer contain any acidic constituents. As already described, the acidic constituents repeatedly found to be troublesome in the prior art are removed very easily by neutralization and subsequent separation of the neutralization products. It is thus possible to obtain prepolymers which may be converted into the crosslinked state with known oxidic hardeners, for example manganese dioxide and/or lead dioxide. The oxidative hardening of two-component mixtures of this type gives elastic, rubber-like compositions which show excellent properties for practical application, more especially high stability to hydrolysis, and which fully satisfy the demands made in practice for elastic sealing compounds of this type. In the practical application of the SH-terminated prepolymers produced and purified in accordance with the invention, it is also possible to use other additives known from the prior art for the establishment of certain practical properties. Additives such as these do not adversely affect the property spectrum, but instead merely contribute towards adapting the properties of the prepolymers to special requirements.

The invention is illustrated but not limited by the following Examples.

EXAMPLE 1

Preparation of a prepolymer 1500 g of a macrotriol (adduct of propylene oxide with glycerol, average molecular weight 2400) and 170 g of thioglycolic acid were mixed with one another in the same quantity by volume of xylene, followed by the addition of 1%, based on the reaction mixture as a whole, of p-toluene sulfonic acid. The reaction was carried out for 4 h at elevated temperature (boiling point of the reaction mixture) in a nitrogen atmosphere and the water of condensation formed during the reaction was separated off by means of a water separator. After just 4 h, almost the total quantity of the predetermined quantity of water had formed. The reaction mixture was cooled to room temperature and neutralized in 5 minutes with 20% aqueous sodium hydroxide. Solid sodium sulfate (anhydrous) was then immediately added until no further uptake of water was observed (180 g). In addition, acidic aluminium trioxide (120 g) was subsequently added. After 45 mins., a filtration aid, 30 g of Kieselgur, was added, the mixture was vigorously stirred for 15 minutes and the solids were allowed to settle for 1 to 2 h. After the salts had been filtered off, the solvent was removed in vacuo at slightly elevated temperature. 1590 g of the purified prepolymer having the properties shown in Table 2 were obtained.

EXAMPLES 2 and 3

Further prepolymers were prepared in the same way as described in Example 1. The quantities of macrotriol (adduct of propylene oxide with glycerol) and thioglycolic acid (TGS) used and the reaction conditions applied are shown in Table 1 below.

TABLE 1

| | Prepolymers prepared as in Example 1 from | | | |
|---|---|---|---|---|
| Ex no. | Macrotriol quantity (g) | (M)[1] | Quantity of TGA[2] (g) | Solvent | Reaction time (h) |
| 1 | 1500 | 2500 | 164 | xylene | 4 |
| 2 | 1550 | 4040 | 110 | toluene | 4 |
| 3 | 500 | 5500 | 28 | xylene | 5 |

[1]M = average molecular weight
[2]TGA = thioglycolic acid

The products obtained had the properties shown in Table 2 below:

TABLE 2

| Ex. no. | Viscosity (Brookfield) | acid number mg KOH/1 g of substance | mercaptan content (%) |
|---|---|---|---|
| 1 | 600 mPa.s | 0.5 | 2.9 |
| 2 | 1150 mPa.s | 0.2 | 1.6 |
| 3 | 2600 mPa.s | 0.1 | 1.1 |

EXAMPLE 4

Use of the polymercaptans produced in accordance with Examples 1 to 3 in sealing compounds.

The polymercaptans of Example 1 to 3 were used in products of the following formulation (percentages=percentages by weight):

(a) polymercaptan: 30%;

(b) plasticizer: 20%;
(c) chalk: 40%;
(d) TiO$_2$: 10%.

5 parts by weight of an MnO$_2$ paste were added as a second component to 100 parts by weight of the above basic formulation. The resulting mixture was made up into (1) test specimens having a layer thickness of 15 mm and a diameter of 45 mm for determination of the Shore-A-hardness and (2) test specimens measuring 20 mm×4 mm×2 mm (length, breadth, depth) for the ultimate strength test.

The determination of Shore-A-hardness using the test specimens described above was carried out in accordance with DIN 53 505; ultimate strength and elongation at break (tensile test) were determined in accordance with DIN 53 504.

The test specimens obtained showed no surface tackiness after hardening.

The results are shown in Table 3 below.

TABLE 3
Determined of the mechanical properties of sealing compounds prepared using the polymercaptans produced in accordance with the invention:

| Polymer-captan of Example no. | Viscosity of the prepolymer (mPa.s) | Shore-A-hardness | Ultimate strength/elongation at break (N.mm$^{-2}$/%) |
|---|---|---|---|
| 1 | 500 | 40–50 | 0.84/90–10/75 |
| 2 | 1100 | 21–23 | 0.89/550 |
| 3 | 1850 | 15–25 | 1.05/900 |

EXAMPLE 5

Use of the polymercaptans produced in accordance with the invention in self-hardening epoxy resin systems.

30 g (Example 5a) and 15 g (Example 5b) of a bisphenol-A derivative (epoxy equivalent weight 195) were added to quantities . of 100 g of the product obtained in accordance with Example 1 to which 5 g of benzyldimethylamine had been added as catalyst. Test specimens having a layer thickness of 15 μm for a diameter of 44 m were prepared from the mixture in polyethylene cups. The test specimens were hardened for 24 h at 50° C. Thereafter Shore-A-hardness was determined in accordance with DIN 53 505. Shore-A-hardness values of 17 and 41 were determined for the test specimens of Example5a and example 5b, respectively.

COMPARISON EXAMPLES 1 to 3

Formulations for joint sealing compounds were prepared in the same way as described in Example 4 using the quantities of plasticizer, chalk and titanium dioxide indicated in that Example. Instead of the polymercaptan produced by the process of the invention, these comparison formulations contained the following sulfur-containing components:

Comparison Example 1: polysulfide "Tiocol LP 32", a product of Elf Aquitaine

Comparison Example 2: SH-terminated polyurethane "Permapol P 780", a product of Products Research Chemicals and Comparison Example 3: the mercaptopropionic acid manufactured by Philips.

Test specimens for the determination of Shore-A-hardness in accordance with DIN 53 505 and test specimens for the determination of ultimate strength and elongation at break in accordance with DIN 53 505 were prepared in the same way as described in Example 4 by adding 5 parts of an MnO$_2$ paste to 100 parts of the basic formulation. After the test specimens had hardened (as described in Example 4), their mechanical properties were determined. The results are shown in Table 4 below.

TABLE 4
Determination of the mechanical properties of comparison sealing compounds according to the prior art

| Comparison Example | Viscosity of the prepolymer (mPa.s) | Shore-A-hardness | Ultimate strength/elongation at break (Nmm$^{-2}$/%) |
|---|---|---|---|
| 1 | 50,000 | 24–30 | 0.2/50 |
| 2 | 150,000 | 22–25 | 1.5/800 |
| 3 | 6,000 | 22–25 | 1.0/800 |

We claim:

1. A process for the preparation of SH-terminated prepolymers comprising the steps of:

(a) reacting one or more adducts of ethylene oxide, propylene oxide, or mixtures thereof with triols or tetraols of the formula:

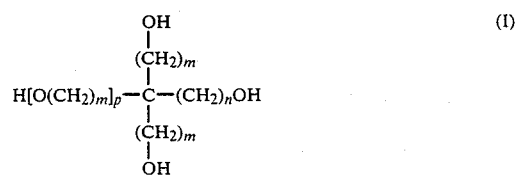

(I)

in which
m=1, 2 or 3,
n=0, 1 or 2 and
p=0 or 1
wherein the one or more adducts have a number average molecular weight of from about 400 to about 10,000, with one or more thioalkane carboxylic acids corresponding to the formula:

HS—R—COOH (II)

in which R is a straight-chain or branched-chain C$_1$–C$_8$ alkylene radical, in such a molar ratio that, for every mole of thioalkane carboxylic acid (II), there is an equivalent of the OH groups in compound (I);

(b) add to the reaction mixture a neutralizing agent in a quantity sufficient to neutralize any unreacted thioalkane carboxylic acid (II);

(c) adding to the reaction mixture one or more compounds which bind the water of neutralization and a precipitant in excess at the same time as, or immediately after, the neutralizing agent; and (d) removing precipitated solids from the reaction mixture.

2. The process of claim 1 wherein in step (a) the adduct is an adduct of propylene oxide.

3. The process of claim 1 wherein in step (a) the adduct has a number average molecular weight of from about 2000 to about 7000.

4. The process of claim 1 wherein in step (a) one or more adducts of propylene oxide with glycerol, trimethylolpropane, or pentaerythritol are employed.

5. The process of claim 4 wherein the adducts have a number average molecular weight of from about 2000 to about 7000.

6. The process of claim 1 wherein in step (a) the R group in formula (II) is straight chain.

7. The process of claim 6 wherein the R group is a straight chain $C_1$–$C_4$ alkylene group.

8. The process of claim 6 wherein the thioalkane carboxylic acid of formula (II) is thioglycolic acid.

9. The process of claim 1 wherein step (a) is carried out in a non-aqueous solvent.

10. The process of claim 9 wherein the solvent forms an azeotrope with water.

11. The process of claim 10 wherein the solvent is one or more of toluene, o-xylene, m-xylene, or p-xylene.

12. The process of claim 1 wherein in step (b) the neutralizing agent is an alkali metal hydroxide or an alkali metal carbonate.

13. The process of claim 12 wherein the neutralizing agent is sodium hydroxide.

14. The process of claim 1 wherein in step (c) the addition of one or more compounds that bind water of neutralization is carried out immediately after step (b).

15. The process of claim 1 wherein in step (c) the one or more compounds that bind water of neutralization is sodium sulfate.

16. The process of claim 1 wherein in step (c) the precipitant is aluminum oxide.

17. The process of claim 9 wherein the solvent is removed by distillation following step (d).

* * * * *